United States Patent
Seo

(10) Patent No.: US 9,603,430 B2
(45) Date of Patent: Mar. 28, 2017

(54) HAIR DRIER

(71) Applicant: TURBO ION KOREA, INC., Incheon (KR)

(72) Inventor: Myung Soo Seo, Incheon (KR)

(73) Assignee: TURBO ION KOREA, INC., Incheon (KR)

( * ) Notice: Subject to any disclaimer, the term of this patent is extended or adjusted under 35 U.S.C. 154(b) by 378 days.

(21) Appl. No.: 14/535,300

(22) Filed: Nov. 6, 2014

(65) Prior Publication Data
US 2015/0216283 A1    Aug. 6, 2015

(30) Foreign Application Priority Data
Feb. 4, 2014 (KR) ........................ 10-2014-0012751

(51) Int. Cl.
| | | |
|---|---|---|
| A45D 20/08 | (2006.01) |
| F04D 25/08 | (2006.01) |
| F04D 27/00 | (2006.01) |
| H02P 7/29 | (2016.01) |
| F24H 3/04 | (2006.01) |
| F24H 9/20 | (2006.01) |

(52) U.S. Cl.
CPC ............ *A45D 20/08* (2013.01); *F04D 25/084* (2013.01); *F04D 27/00* (2013.01); *F24H 3/0423* (2013.01); *F24H 9/2071* (2013.01); *H02P 7/29* (2013.01)

(58) Field of Classification Search
CPC ....... A45D 20/08; F04D 25/084; F04D 27/00; H02P 7/29; F24H 3/0423; F24H 9/2071
See application file for complete search history.

(56) References Cited

U.S. PATENT DOCUMENTS

2008/0116753 A1*   5/2008   Carlucci ................ A45D 20/10
                                                                          310/50

* cited by examiner

*Primary Examiner* — Jiping Lu
(74) *Attorney, Agent, or Firm* — Novick, Kim & Lee, PLLC; Jae Youn Kim

(57) ABSTRACT

A hair dryer is disclosed. The hair dryer includes a power supply for supplying electric power, a voltage detector for detecting a voltage of the electric power supplied from the power supply, a controller for controlling a driving speed of a motor in accordance with the voltage detected by the voltage detector, and a motor unit comprising first and second triacs to be selectively turned in accordance with the voltage detected by the voltage detector under a control of the controller, a rectifier to be turned on by a selected one of the first and second triacs, and the motor. The motor receives the voltage from the rectifier.

4 Claims, 4 Drawing Sheets

HAIR DRIER

CROSS-REFERENCE TO RELATED APPLICATION

The application claims priority and the benefit of Korean Patent Application No. 10-2014-0012751 filed on Feb. 4, 2014, the entire disclosures of which are incorporated herein by reference.

BACKGROUND OF THE INVENTION

Field of the Invention

The present invention relates to a hair dryer, and more particularly to a hair dryer capable of automatically controlling a driving voltage and an output.

Description of the Related Art

A hair dryer is a household appliance in which a fan is attached to a shaft of a small motor, to blow out a stream of hot air generated by a heater through an air outlet. Such a hair dryer is also referred to as a "blower". Such a hair dryer may be used to remove moisture from hair or style hair, using a stream of hot air.

Meanwhile, in such a hair dryer, the heater mounted therein is designed to operate at a commercial voltage. Accordingly, when the heater operates at a commercial voltage of 110V, resistance of a heating coil thereof should be set to meet 110V supply power. On the other hand, when the heater operates at a commercial voltage of 220V, resistance of a heating coil thereof should be set to meet 220V supply power.

If the 110V hair dryer is connected to a 220V commercial power source, there is a possibility that a fire is generated and, as such, the user is exposed to great danger.

In the case of a 1,500W 110V hair dryer, a heater having a resistance of about 8Ω is used to generate a desired output. When the 100V hair dryer is connected to a 220V commercial power source, an output of 6,000W is momentarily generated and, as such, the heater of the hair dryer is overheated, thereby resulting in generation of a fire. In this case, the hair dryer is damaged and, as such, can no be longer used.

Meanwhile, most hair dryers employ a DC motor operating at a DC voltage of about 28 to 38V in accordance with characteristics of the hair dryers. Since the input voltage of such a hair dryer is an AC voltage, it is necessary to convert the AC voltage into a DC voltage. To this end, a heating wire is arranged at an input terminal of the motor, to drop the commercial voltage, and the dropped voltage is bridge-rectified, to drive the DC motor. For this reason, there is a problem in that it is impossible to arrange both a heating wire for 110V and a heating wire for 220V in order to use the heating wires as motor loads for voltage drop.

On the other hand, when a 220V hair dryer is used at a 110V commercial voltage, the amount of air stream is considerably reduced due to a relatively low motor voltage. In this case, accordingly, the hair dryer cannot perform a desired intrinsic function thereof.

In order to solve the above-described problems, a hair dryer operating on electric power of either 110V or 220V has been proposed. In this case, a manual switch is included in the hair dryer, to enable the user to directly operate the switch.

In this hair dryer, however, there is a problem in that the user is directly exposed to danger, as mentioned above, when the user carelessly connects the hair dryer to a 220V commercial power source under the condition that the hair dryer has been switched for 110V.

SUMMARY OF THE INVENTION

Therefore, the present invention has been made in view of the above problems, and it is an object of the present invention to provide a hair dryer capable of substantially eliminating various problems generated in conventional cases due to the limitations and drawbacks of conventional technologies.

It is another object of the present invention to provide a hair dryer capable of safely operating without requiring a separate user operation even when the air dryer is connected to a supply voltage of either 110V or 220V.

It is a further object of the present invention to provide a hair dryer capable of safely operating while generating a constant output without requiring a separate user operation even when the air dryer is connected to a supply voltage of either 110V or 220V.

In accordance with the present invention, the above and other objects can be accomplished by the provision of a hair dryer including a power supply for supplying electric power, a voltage detector for detecting a voltage of the electric power supplied from the power supply, a controller for controlling a driving speed of a motor in accordance with the voltage detected by the voltage detector, and a motor unit comprising first and second triacs to be selectively turned in accordance with the voltage detected by the voltage detector under a control of the controller, a rectifier to be turned on by a selected one of the first and second triacs, and the motor, the motor receiving the voltage from the rectifier.

The hair dryer may further include a phase detector for detecting a phase of the electric power supplied from the power supply, and a heater for heating a stream of air generated by the motor under a control of the controller. In this case, the controller may control an output from the heater in accordance with the voltage detected by the voltage detector such that predetermined electric power is output, irrespective of the voltage supplied from the power supply.

The rectifier may include thyristors.

The controller may output a control pulse signal having a waveform according to the voltage detected by the voltage detector such that predetermined electric power is output, irrespective of the voltage supplied from the power supply.

In accordance with the hair dryer of the present invention, it is possible to automatically detect whether the input commercial voltage is 110V or 220V when the hair dryer is connected to a commercial power outlet and, as such, the heater and motor are controlled to operate at a desired voltage without requiring switching operation of a manual switch. Accordingly, it may be possible to avoid a danger caused by incorrect or no switching of the manual switch and, as such, safety of the user is secured.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Reference will now be made in detail to the preferred embodiments of the present invention, examples of which are illustrated in the accompanying drawings.

In the following description of the present invention, a detailed description of known functions and configurations incorporated herein will be omitted when it may obscure the subject matter of the present invention. Further, the following terms are defined in consideration of the configurations and functions in the present invention and may be construed in different ways by intention or practice of users and operators. Therefore, the definitions of terms used in the present disclosure should be construed based on the contents of the disclosure.

Figure 1:
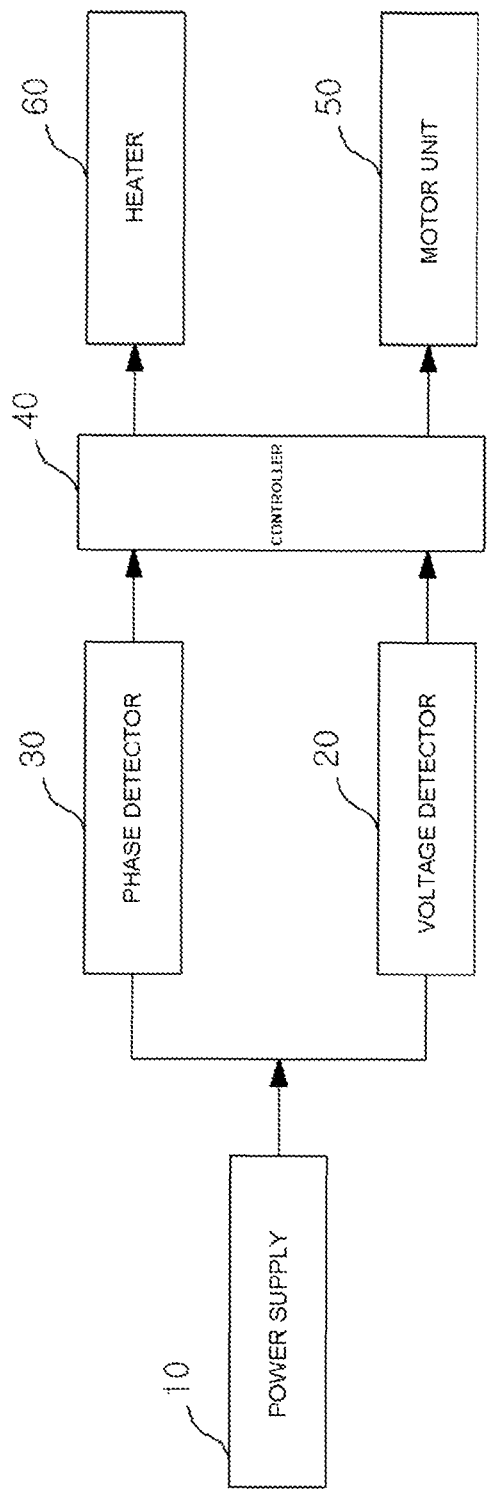
FIG. 1 is a block diagram schematically illustrating a configuration of a hair dryer according to an exemplary embodiment of the present invention.

FIG. 1 is a block diagram schematically illustrating a configuration of a hair dryer according to an exemplary embodiment of the present invention.

Referring to FIG. 1, the hair dryer according to the illustrated embodiment, which is designated by reference numeral "1", includes a power supply 10, a voltage detector 20, a phase detector 30, a controller 40, a motor unit 50, and a heater 60.

The power supply 10 generates a voltage required to drive the hair dryer 1. In practice, the power supply 10 supplies an AC voltage of 110V or 220V.

The voltage detector 20 detects whether the level of the voltage supplied from the power supply 10 is 110V or 220V, and applies a detection signal representing the detected voltage level to the controller 40.

The phase detector 30 detects a phase of an AC voltage supplied from the power supply 10, and applies a detection signal representing the detected voltage phase to the controller 40.

The controller 40 controls driving of the heater 40 and motor in accordance with the voltage level detected by the voltage detector 20 and the AC voltage phase detected by the phase detector 30 in order to output constant electric power.

The motor unit 50 receives a supply voltage from the power supply 10 under control of the controller 40, and rotates a fan of the hair dryer 1, to generate a stream of air.

The heater 60 heats a stream of air generated from the motor unit 50 under control of the controller 40, to generate a stream of hot air from the hair dryer 1.

Figure 2:
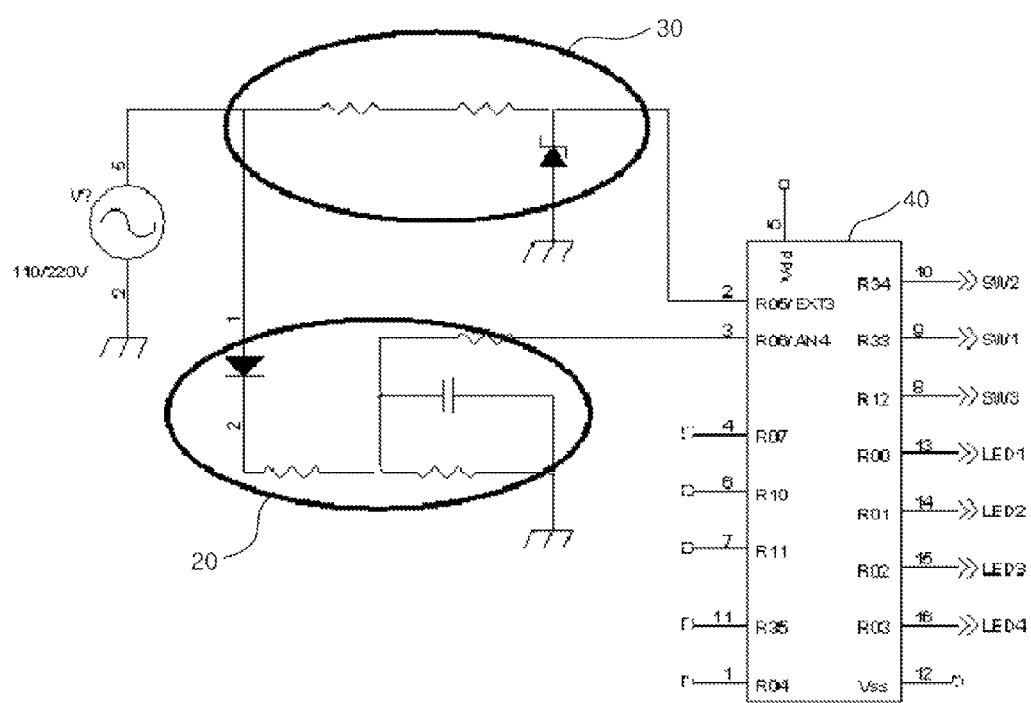
FIG. 2 is a diagram illustrating circuit configurations of a voltage detector and a phase detector illustrated in FIG. 1.
Figure 3A:
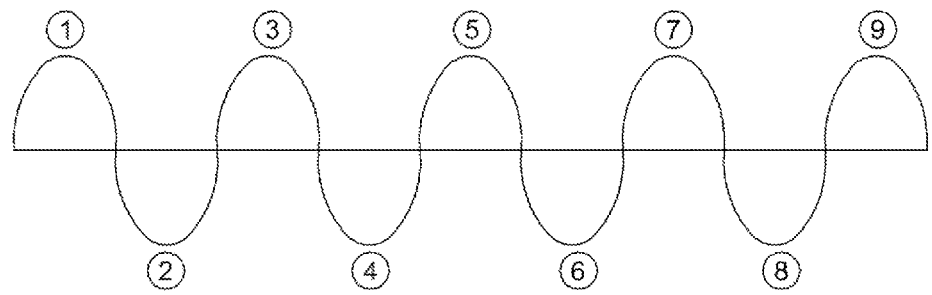
FIG. 3(a) and FIG. 3(b) are waveform diagrams explaining an operation of controlling a heater in accordance with an embodiment of the present invention.
Figure 3B:
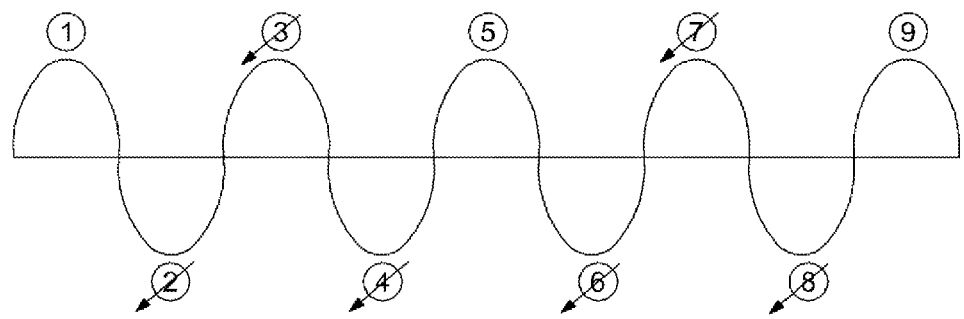
Figure 4:
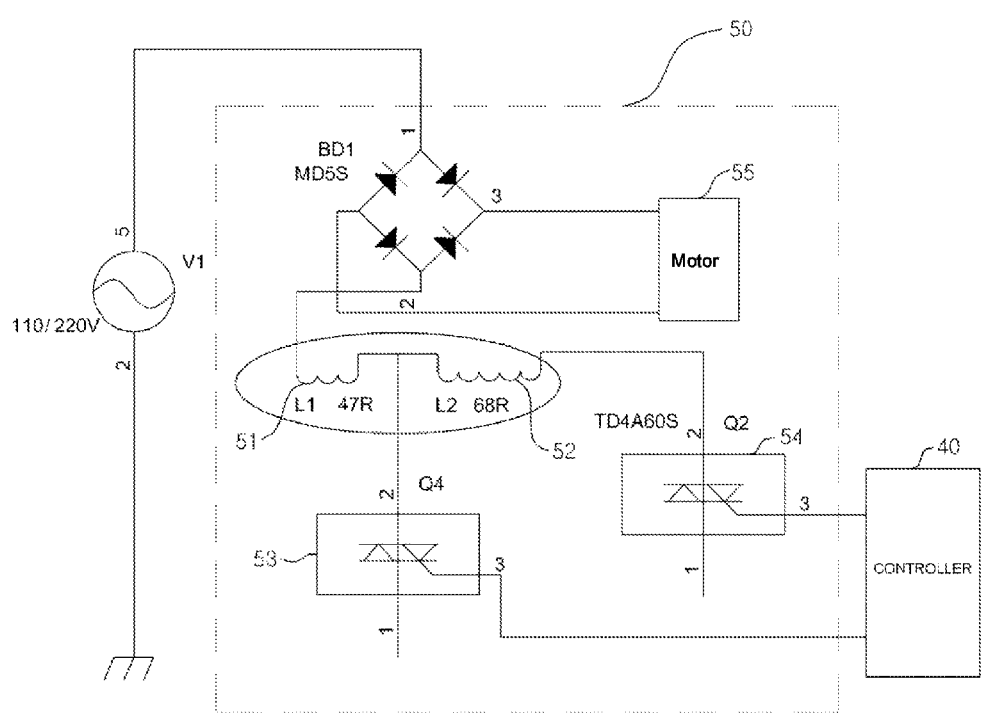
FIG. 4 is a circuit diagram explaining an operation of controlling a motor unit in accordance with an embodiment of the present invention.

FIG. 2 is a diagram illustrating circuit configurations of the voltage detector and phase detector of FIG. 1. FIG. 3(a) and FIG. 3(b) are waveform diagrams explaining an operation of controlling the heater in accordance with an embodiment of the present invention. FIG. 4 is a circuit diagram explaining an operation of controlling the motor unit in accordance with an embodiment of the present invention.

Referring to FIGS. 2 to 4, the controller 40 continuously outputs a sine wave as shown in FIG. 3(a), to control the heater 60, when the voltage detected by the voltage detector 20 is 110V.

In this case, if the resistance of a heating coil included in the heater 60 is 8Ω, the hair dryer 1 generates an output of 1,512W (110V*110V)/852=1.512W).

When the voltage detected by the voltage detector 20 is 220V, the controller 40 controls an output from the hair dryer 1 by turning on periods ①, ⑤, and ⑨ of a phase signal detected by the phase detector 30 while turning off periods ②, ③, ④, ⑥, ⑦, and ⑧ of the phase signal, as illustrated in FIG. 3(b).

That is, if all periods ①, ②, ③, ④, ⑤, ⑥, ⑦, ⑧, and ⑨ are turned on when the voltage detected by the voltage detector 20 is 220V, the output from the hair dryer 1 is 6,025 W (220*220V)/8Ω=6,025 W). However, when only the periods ①, ⑤, and ⑨ are turned on, as in the illustrated embodiment, the output from the hair dryer 1 is 1,506W (6,025W/4=1.506W). In the illustrated embodiment, accordingly, it may be possible to obtain an output substantially equal to the output obtained when the input commercial voltage is 110V.

The motor unit 50 is controlled by modulating the phase of the input commercial voltage such that speed of the motor unit 50 is controlled through four periods. For this reason, for both 110V and 220V, it is impossible to control the motor unit 50, using the same control value. To this end, speed of the motor unit 50 is controlled, using a configuration including heating wires 51 and used as motor loads while having resistances of 47Ω and 68Ω such that a total heating wire resistance is 115Ω, a first triac connected to a tap between the heating wires 51 and 52 at a 110V gate thereof, and a second triac 54 connected to the heating wires 51 and 52 in series at a 220V gate thereof. In addition to the above-described configuration, the motor unit 50 includes a rectifier to rectify supply power from the power supply 10, and a motor 55 to receive a voltage supplied from the rectifier. The rectifier is connected to the triacs 53 and 54 via thyristors, namely, the heating wires 51 and 52. When the input commercial voltage is 110V, the controller 40 turns on the 110V gate of the first triac 53. On the other hand, when the input commercial voltage is 220V, the controller 40 turns on the 220V gate of the second triac 54. In accordance with such control operations, the controller 40 controls speed of the motor unit 50.

That is, the controller 40 may control the 110V and 220V triacs 53 and 54 such that the 110V and 220V triacs 53 and 54 are selectively turned on, in accordance with the above-described configuration in which the 110V triac 53 is connected to the tap between the heating wires 51 and 52, and the second triac 54 is connected to the heating wires 51 and 52 in series. In accordance with such a control system, it may be possible to automatically switch the supply voltage to a desired level without using a manual switch when the hair dryer 1 is connected to a 110V or 220V commercial power outlet.

As apparent from the above description, in accordance with the illustrated embodiment of the present invention, it is possible to automatically detect whether the input commercial voltage is 110V or 220V when the hair dryer is connected to a commercial power outlet and, as such, the heater and motor are controlled to operate at a desired voltage without requiring switching operation of a manual switch. Accordingly, it may be possible to avoid a danger caused by incorrect or no switching of the manual switch and, as such, safety of the user is secured.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A hair dryer comprising:
a power supply for supplying electric power;
a voltage detector for detecting a voltage of the electric power supplied from the power supply;
a controller for controlling a driving speed of a motor in accordance with the voltage detected by the voltage detector; and
a motor unit comprising first and second triacs to be selectively turned in accordance with the voltage detected by the voltage detector under a control of the controller, a rectifier to be turned on by a selected one of the first and second triacs, and the motor, the motor receiving the voltage from the rectifier.

2. The hair dryer according to claim 1, further comprising:
a phase detector for detecting a phase of the electric power supplied from the power supply; and
a heater for heating a stream of air generated by the motor under a control of the controller,
wherein the controller controls an output from the heater in accordance with the voltage detected by the voltage detector such that predetermined electric power is output, irrespective of the voltage supplied from the power supply.

3. The hair dryer according to claim 1, wherein the rectifier comprises thyristors.

4. The hair dryer according to claim 2, wherein the controller outputs a control pulse signal having a waveform according to the voltage detected by the voltage detector such that predetermined electric power is output, irrespective of the voltage supplied from the power supply.

* * * * *